United States Patent
Hedegaard

(10) Patent No.: US 12,503,343 B2
(45) Date of Patent: Dec. 23, 2025

(54) SELF-HOISTING CRANE AND METHOD OF MOUNTING AND OPERATING SUCH CRANE

(71) Applicant: LIFTRA IP APS, Aalborg SV (DK)

(72) Inventor: Simon Hedegaard, Aalborg SV (DK)

(73) Assignee: Liftra IP APS, Aalborg SV (DK)

( * ) Notice: Subject to any disclaimer, the term of this patent is extended or adjusted under 35 U.S.C. 154(b) by 234 days.

(21) Appl. No.: 18/288,307

(22) PCT Filed: May 9, 2022

(86) PCT No.: PCT/EP2022/062425
§ 371 (c)(1),
(2) Date: Oct. 25, 2023

(87) PCT Pub. No.: WO2022/234140
PCT Pub. Date: Nov. 10, 2022

(65) Prior Publication Data
US 2024/0208780 A1    Jun. 27, 2024

(30) Foreign Application Priority Data
May 7, 2021   (DK) ............................ PA 2021 70216

(51) Int. Cl.
*B66C 23/20*   (2006.01)
*B66C 23/32*   (2006.01)
*F03D 13/10*   (2016.01)

(52) U.S. Cl.
CPC ............ *B66C 23/32* (2013.01); *B66C 23/207* (2013.01); *F03D 13/10* (2016.05); *F05B 2230/61* (2013.01)

(58) Field of Classification Search
CPC ......... B66C 23/207; B66C 1/68; B66C 23/32; F03D 13/10; F05B 2230/61
See application file for complete search history.

(56) References Cited

U.S. PATENT DOCUMENTS

| 4,293,121 A | 10/1981 | Wallin |
| 9,115,693 B2 * | 8/2015 | Fenger ................... F03D 80/50 |

(Continued)

FOREIGN PATENT DOCUMENTS

| CN | 108996405 A | 12/2018 |
| SE | 417947 B | 4/1981 |

(Continued)

OTHER PUBLICATIONS

Danish Search Report for Danish Application No. PA 2021 70216, dated Nov. 10, 2021.

*Primary Examiner* — Andrew J Triggs
(74) *Attorney, Agent, or Firm* — Birch, Stewart, Kolasch & Birch, LLP

(57) ABSTRACT

Self-hoisting crane (1) and method of mounting and operating such crane The self-hoisting crane is adapted to be hoisted from ground to a nacelle (2) or a tower (46) of a wind turbine (3) by operation of a cable winch (9) arranged at ground (10) and is adapted to be operated in its mounted position on the nacelle or on the tower by operation of the same cable winch. The cable extends from a hook block (6), out through a pedestal (4) of the crane, from the nacelle or from the tower and to the cable winch at the ground. The self-hoisting crane is provided with a cable crawler (11) having at least one motor driven traction sheave ($12_2$) adapted to, during operation of the self-hoisting crane, transfer a pulling force to the cable (8) through friction. The cable crawler is shiftable between an active state (13) in which the traction sheave may transfer a pulling force to the cable and a passive state in which the traction sheave may transfer no pulling force to the cable.

20 Claims, 8 Drawing Sheets

(56) References Cited

U.S. PATENT DOCUMENTS

| | | | |
|---|---|---|---|
| 11,932,520 B2* | 3/2024 | Fenger | F03D 13/10 |
| 12,116,249 B2* | 10/2024 | Fenger | F03D 13/10 |
| 2018/0283359 A1 | 10/2018 | Senthoorpandian | |
| 2024/0208780 A1* | 6/2024 | Hedegaard | B66C 23/207 |

FOREIGN PATENT DOCUMENTS

| WO | WO 2013/113377 A1 | 8/2013 |
|---|---|---|
| WO | WO 2020/177824 A2 | 9/2020 |
| WO | WO 2020/201237 A2 | 10/2020 |
| WO | WO 2020/221716 A1 | 11/2020 |

* cited by examiner

SELF-HOISTING CRANE AND METHOD OF MOUNTING AND OPERATING SUCH CRANE

The present invention relates to a self-hoisting crane adapted to be mounted on a nacelle or on a tower of a wind turbine, wherein the self-hoisting crane includes a pedestal, a boom arm, a hook block and at least one cable adapted to lift or lower the hook block in relation to the boom arm for operation of the self-hoisting crane in its mounted position on the nacelle or on the tower, wherein the at least one cable is adapted to extend from the hook block, out through the pedestal, from the nacelle or from the tower and to a cable winch arranged at the ground, wherein the self-hoisting crane is adapted to be hoisted from the ground to the nacelle or to the tower by operation of the cable winch arranged at the ground, and wherein the self-hoisting crane is adapted to be operated in its mounted position on the nacelle or on the tower by operation of the cable winch arranged at the ground.

WO 2020221716 A1 (Liftra ApS) discloses a self-hoisting crane adapted to be hoisted from a container to a nacelle by operating a cable winch in the container, cables adapted to extend from the cable winch, around an exit sheave arranged in the container, and exit the container from the exit sheave in an upward direction in order to pass around at least one roller arranged at a crane base on the nacelle and continue in a downward direction to the crane, enter through a central opening in the crane pedestal and continue to the hook block.

WO 2020201237 A2 (Liftra ApS) discloses a self-hoisting crane which is hoisted from the ground to the nacelle by operating a cable winch at ground whereby a cable extends from the crane to a roller at the nacelle and to the cable winch. A hoist block with the roller is arranged on a jib at a first hoist block position above a second hinge part of a crane base mounted on the nacelle and extended in horizontal direction from the nacelle. When a first hinge part of the crane is positioned at a corresponding second hinge part of the crane base, the cable extends in a downward direction directly from the roller of the hoist block and through a central opening in a pedestal. After mutual connection of the first and second hinge parts whereby the crane is mounted in its operational position on the crane base, the hoist block is removed from its first hoist block position. In other known embodiments, the crane base may be mounted on a tower of a wind turbine rather than on a nacelle of the wind turbine. In such case, the crane base may by means of a clamping mechanism be mounted for instance on a top part of the tower in order for the crane to used for instance during mounting of a nacelle on the tower.

When a self-hoisting crane is operated in its mounted position on a nacelle or on a tower of a wind turbine, the weight of the cables extending from the hook block and downward to the cable winch arranged at the ground may pose a challenge when the hook block has to be lowered or lifted without any external load attached. This is because the weight of the hook block and the weight of the part of the cables extending from the tip of the boom arm to the hook block may not be enough to counteract the weight of the cables extending from the hook block and downward to the cable winch arranged at the ground. The result may be that the cables run backwards or that it is not possible to lower the hook block. In order to overcome this challenge, it is known to provide ballast weights on the hook block so that it may counteract the weight of the cables extending from the hook block to the cable winch arranged at the ground. However, by using such ballast weights, the weight of the ballast weights is detracted from the load that may be lifted by the self-hoisting crane.

The problem of the weight of the cables extending from the hook block and downward to the cable winch arranged at the ground increases with increasing height of wind turbines to be serviced, which currently reaches about 200 metres. Furthermore, demands for an increased working load limit of the self-hoisting crane itself requires strengthening of the structure of the components of the crane which may typically lead to a heavier crane. However, when the self-hoisting crane, during installation, is hoisted to the top of a wind turbine, the strength of the cables which are used limits the allowed maximum weight of the self-hoisting crane including hook block and possible ballast weights. In order to compensate for a larger weight of the components of the self-hoisting crane, it may therefore be necessary to reduce the weight of the hook block and/or operate without ballast weights on the hook block. In this situation, the problem of the weight of the cables extending from the hook block to the cable winch at the ground has been even further increased. This is because the weight of the hook block and the weight of the part of the cables extending from the tip of the boom arm to the hook block may not be enough to counteract the weight of the cables extending from the hook block and downward to the cable winch arranged at the ground.

The object of the present invention is to prevent or eliminate the above-mentioned problem that the at least one cable runs backwards or that it is not possible to lower the hook block when no external load is carried by the hook block.

In view of this object, the self-hoisting crane is provided with a cable crawler having at least one motor driven traction sheave adapted to, during operation of the self-hoisting crane in its mounted position on the nacelle or on the tower, transfer a pulling force to the at least one cable through friction, and the cable crawler is shiftable between an active state in which the traction sheave may transfer a pulling force or may transfer at least a substantial pulling force to the at least one cable and a passive state in which the traction sheave may transfer no pulling force or at least substantially no pulling force to the at least one cable.

In this way, when the hook block has to be lowered or lifted without any external load attached, the motor driven traction sheave of the cable crawler may transfer a suitable pulling force to the at least one cable through friction, whereby the weight of the cables extending from the hook block and downward to the cable winch may be counteracted. Thereby, it may always be possible to lower the hook block independently of the weight of the hook block and the length of the at least one cable extending from the hook block to the cable winch. Because the cable crawler is shiftable from its active state in which the traction sheave may transfer a pulling force to the at least one cable to its passive state in which the traction sheave may transfer no pulling force to the at least one cable, the cable crawler may not interfere with the operation of the self-hoisting crane when an external load is lifted by the hook block. That means that the cable crawler may be prevented from providing an unwanted braking force to the cable during the lifting operation.

As a result of the present invention, the weight of the hook block without any external load does not need to counteract the weight of the cables extending from the hook block and downward to the cable winch at ground. Therefore, it is possible to save weight on the hook block, i.e. design a lighter hook block, and consequently an increase in the working load limit of the self-hoisting crane is possible even though the weight of the self-hoisting crane itself is thereby increased. The combined weight of the self-hoisting crane and hook block may be kept low enough that the limit of the strength of the cables used for lifting the crane is not exceeded.

In a structurally particularly advantageous embodiment, in the active state of the cable crawler, a first wrap angle represents the angle of contact between the at least one cable and the traction sheave, and, in the passive state of the cable crawler, a second wrap angle represents the angle of contact between the at least one cable and the traction sheave, and in that the first wrap angle is at least substantially greater than the second wrap angle. Thereby, due to a relatively large first wrap angle in the active state of the cable crawler, the at least one motor driven traction sheave may, during operation of the self-hoisting crane in its mounted position on the nacelle or on the tower, transfer a pulling force to the at least one cable through friction, said pulling force, together with the weight of the hook block, is large enough to counteract the weight of the cables extending from the hook block and downward to the cable winch arranged at the ground. On the other hand, due to a relatively very small second wrap angle in the passive state of the cable crawler, the at least one motor driven traction sheave may, during operation of the self-hoisting crane in its mounted position on the nacelle or on the tower, transfer only a relatively very small or almost negligible pulling force to the at least one cable through friction, so that the cable crawler may practically be prevented from providing any substantial unwanted braking force to the cable during the lifting operation.

In a structurally particularly advantageous embodiment, the at least one cable, in succession, contacts a first support sheave, the motor driven traction sheave and a second support sheave, in that, seen in a transverse direction of the at least one cable, the motor driven traction sheave runs on a first traction side of the at least one cable and the first and second support sheaves run on a second side of the at least one cable, and in that the motor driven traction sheave is relatively movable in relation to at least one of the first and second support sheaves in the transverse direction of the at least one cable between an active position, in which the cable crawler is in its active state, and a passive position, in which the cable crawler is in its passive state. The first and second support sheaves may be fixed rotatably on a frame, such as for instance the boom arm of the self-hoisting crane, or such as the nacelle or the tower of a wind turbine on which the self-hoisting crane is mounted, and the motor driven traction sheave may be arranged displaceably in relation to said frame. Alternatively, the motor driven traction sheave may be fixed rotatably on such a frame, and the first and/or second support sheave may be arranged displaceably in relation to said frame. In any case, a relative displacement, seen in a transverse direction of the at least one cable, between the motor driven traction sheave and the first and/or second support sheave, may change said wrap angle between a relatively large first wrap angle in the active state of the cable crawler and a relatively very small second wrap angle in the passive state of the cable crawler, whereby the above-mentioned features may be achieved.

In an embodiment, the motor driven traction sheave is spring-biased relatively to the at least one of the first and second support sheaves from the passive position of the traction sheave to the active position of the traction sheave. Thereby, the cable crawler may automatically shift between its active state and its passive state depending on whether the hook block is carrying an external load or not. When the hook block is carrying an external load, the at least one cable may tend to follow an at least relatively straight path and thereby displace the motor driven traction sheave relatively to the at least one of the first and second support sheaves, against the spring-bias, so that the traction sheave may reach its passive position. Thereby, the motor driven traction sheave may be prevented from providing any substantial unwanted braking force to the at least one cable during the lifting operation. On the other hand, when the hook block is not carrying any external load, the at least one cable may follow the path formed by the motor driven traction sheave and the at least one of the first and second support sheaves, in the active position of the traction sheave, without pressing the motor driven traction sheave relatively to the at least one of the first and second support sheaves, against the spring-bias. Thereby, the traction sheave may remain in its active position and may therefore transfer a suitable pulling force to the at least one cable through friction, whereby the weight of the cables extending from the hook block and downward to the cable winch may be counteracted when operating the self-hoisting crane without external load. Due to this automatic shift between the active state and the passive state of the cable crawler, the operator of the self-hoisting crane may not need to control the cable crawler manually.

In an embodiment, in the active position of the motor driven traction sheave, the traction sheave presses the at least one cable against at least one pressure wheel. Thereby, by pressing the motor driven traction sheave against the at least one pressure wheel with the at least one cable in between, the motor driven traction sheave of the cable crawler may transfer an even larger pulling force to the at least one cable through friction.

Preferably, the at least one pressure wheel is a metal wheel.

In an embodiment, the motor driven traction sheave has a diameter of at least 3 times, preferably at least 4 times, the diameter of the at least one pressure wheel. Thereby, by providing a relatively small pressure wheel pressing the at least one cable against a relatively larger motor driven traction sheave, the friction between the motor driven traction sheave and the at least one cable may be increased relatively more over a relatively small part of the wrap angle of the motor driven traction sheave. Consequently, the motor driven traction sheave of the cable crawler may transfer an even larger pulling force to the at least one cable through friction.

In an embodiment, in the active position of the motor driven traction sheave, the traction sheave is guided to be relatively displaceable in relation to the at least one pressure wheel in a direction forming an angle of between 30 and 85 degrees, preferably between 45 and 75 degrees, with an axis through a rotation axis of the traction sheave and a rotation axis of the at least one pressure wheel. Thereby, a wedge-like effect may be obtained when the motor driven traction sheave is pressed against the at least one pressure wheel with the at least one cable in between. This may be achieved in that the contact points of the traction sheave and the at least one pressure wheel, respectively, are not pressed against each other in the radial directions of the traction sheave and the at least one pressure wheel, respectively, but rather in respective oblique directions in relation to said radial directions. The wedge-like effect may ensure that the motor driven traction sheave is pressed even harder against the at least one pressure wheel with the at least one cable in between, thereby resulting in that the motor driven traction sheave of the cable crawler may transfer an even larger pulling force to the at least one cable through friction.

In an embodiment, a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and the cable crawler is adapted to switch the motor drive to its free-wheeling mode when the cable crawler is shifted from its active state to its passive state. Switching between the active mode and the passive mode may be performed by controlling software or by means of a mechanical clutch. Thereby, it may be ensured that in the active mode of the motor drive, the cable crawler may transfer sufficient pulling force to the at least one cable, whereas in the passive mode of the motor drive, the cable crawler may practically not interfere with the operation of the self-hoisting crane when an external load is lifted by the hook block.

In an embodiment, motor drive for the at least one motor driven traction sheave is provided with a speed control adapted to, at least in the active mode of the motor drive, limit the travel speed of the at least one cable at the position of the self-hoisting crane relatively to the travel speed of the at least one cable at the position of the cable winch arranged at the ground. Thereby, it may ensured that the travel speed of the at least one cable does not differ substantially between the position of the self-hoisting crane and the position of the cable winch. This may ensure that the at least one cable is generally suitably stretched. The speed control of the motor drive may receive information of the travel speed of the at least one cable at the position of the cable winch by wireless communication, such as WIFI.

In a structurally particularly advantageous embodiment, the cable crawler includes a motor housing provided with a motor drive and the at least one motor driven traction sheave, and the motor housing is swingable about a rotation point in relation to a frame carrying the first and second support sheaves between an active position in which the cable crawler is in its active state and a passive position in which the cable crawler is in its passive state.

In an embodiment, a spring pack is arranged between the motor housing and the frame so that, in the active position of the motor housing, the spring pack acts on the motor housing with a first moment arm in relation to the rotation point of the motor housing, and, in the passive position of the motor housing, the spring pack acts on the motor housing with a second moment arm in relation to the rotation point of the motor housing, and the first moment arm is greater than the second moment arm. Thereby it may be ensured that, in the active state of the cable crawler, the motor driven traction sheave is biased by means of a suitable relatively large force against the at least one of the first and second support sheaves and possibly against the at least one pressure wheel with the at least one cable in between, in order to provide a suitable pulling force to the at least one cable. On the other hand it may be ensured that, in the passive state of the cable crawler, the motor driven traction sheave is biased by means of a suitable relatively low force, against the at least one cable so that the cable crawler may not interfere with the operation of the self-hoisting crane when an external load is lifted by the hook block.

In a structurally particularly advantageous embodiment, the cable crawler is arranged in the self-hoisting crane, preferably in the boom arm, and preferably at an end of the boom arm next to the pedestal. Thereby, the cable crawler may be provided as an integral part of the self-hoisting crane so that no separate mounting of the cable crawler, for instance on the wind turbine, is necessary. The operation of the cable crawler may be automatic and does not need to be taken into account by the operator.

The present invention further relates to a method of mounting and subsequently operating a self-hoisting crane on a nacelle or on a tower of a wind turbine, whereby the self-hoisting crane includes a pedestal, a boom arm, a hook block and at least one cable adapted to lift or lower the hook block in relation to the boom arm for operation of the self-hoisting crane in its mounted position on the nacelle or on the tower, whereby the at least one cable extends from the hook block, out through the pedestal, from the nacelle or from the tower and to a cable winch arranged at the ground, whereby the self-hoisting crane is hoisted from the ground to the nacelle or to the tower by operating the cable winch arranged at the ground, and whereby the self-hoisting crane is operated in its mounted position on the nacelle or on the tower by operating the cable winch arranged at the ground.

The method according to the present invention is characterised in that the self-hoisting crane is provided with a cable crawler having at least one motor driven traction sheave adapted to transfer a pulling force to the at least one cable through friction, in that the cable crawler is shiftable between an active state in which the traction sheave transfers a pulling force or an at least substantial pulling force to the at least one cable and a passive state in which the traction sheave transfers no or at least substantially no pulling force to the at least one cable, in that, when the self-hoisting crane is operated in its mounted position on the nacelle or on the tower without any or at least substantially without any external load attached to the hook block, the cable crawler is operated in its active state, and in that, when the self-hoisting crane is operated in its mounted position on the nacelle or on the tower with an at least substantial external load attached to the hook block, the cable crawler is operated in its passive state. Thereby, the above-described advantages may be obtained.

According to the present invention, a number of embodiments of the above-mentioned method of mounting and subsequently operating a self-hoisting crane on a nacelle or on a tower of a wind turbine correspond to the above-mentioned embodiments of the self-hoisting crane according to the present invention.

The invention will now be explained in more detail below by means of examples of embodiments with reference to the very schematic drawing, in which FIG. 1 is a side view of a container for use with a self-hoisting crane according to the invention;

In the following, generally, similar elements of different embodiments have been designated by the same reference numerals.

Figure 4:
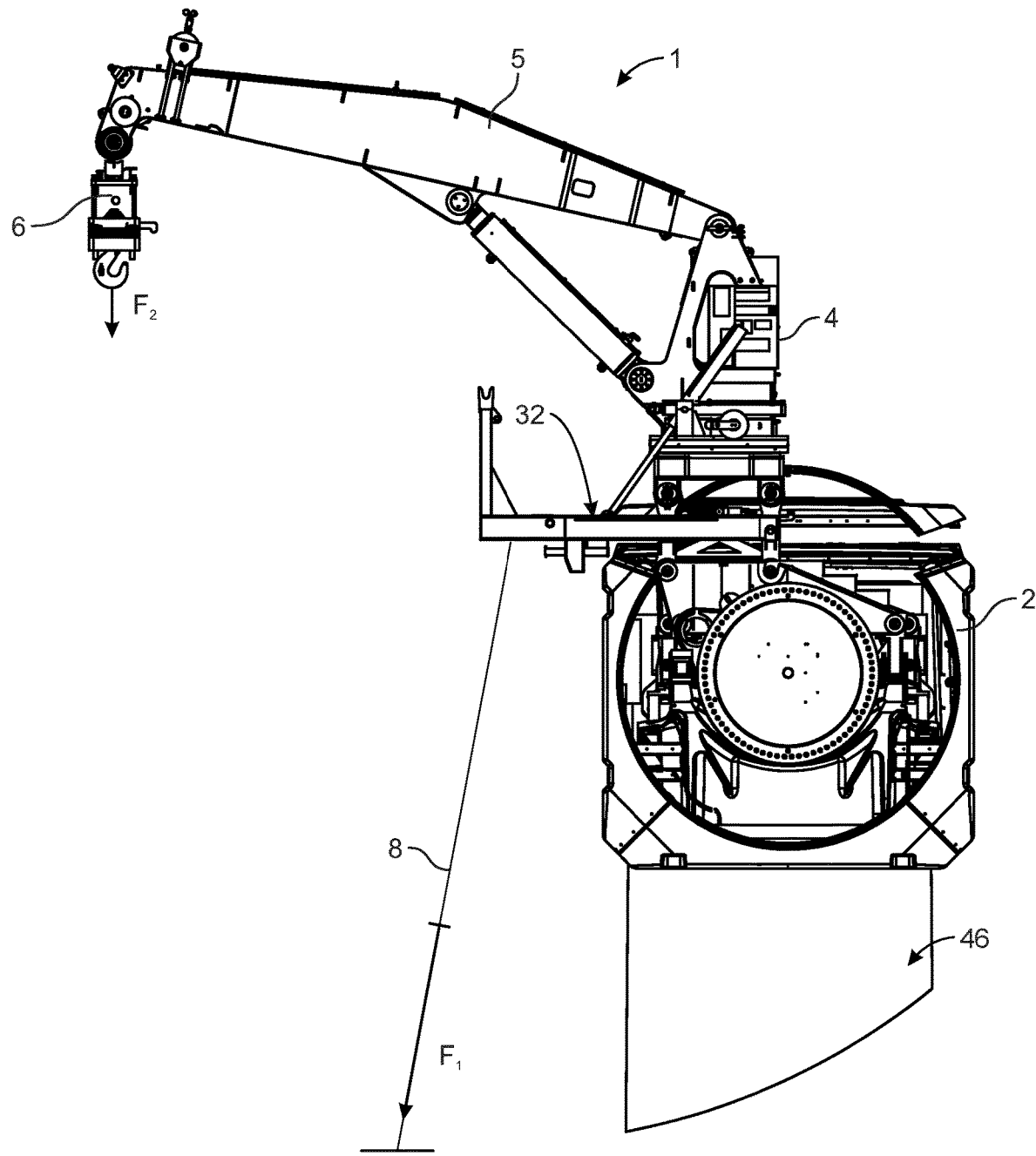
FIG. 4 is a side view of a self-hoisting crane according to the invention mounted on the nacelle of the wind turbine of FIG. 3.
Figure 5:
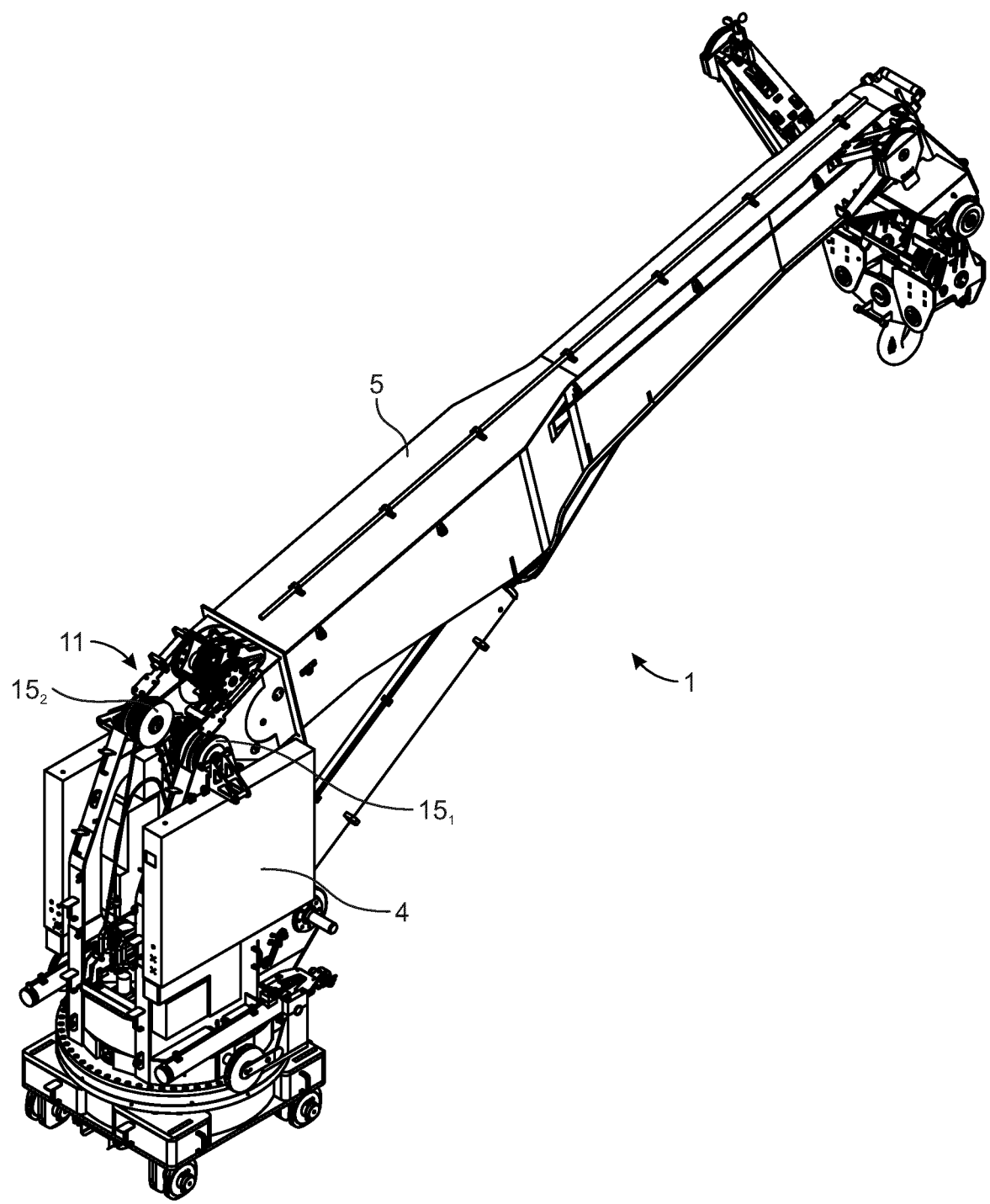
FIG. 5 is a perspective view of the self-hoisting crane of FIG. 4, whereby the wind turbine is not illustrated.

FIG. 4 shows an embodiment of a self-hoisting crane 1 according to the present invention, mounted on a nacelle 2 of a wind turbine 3. The self-hoisting crane includes a pedestal 4, a boom arm 5, a hook block 6 and a first and a second cable 7, 8 or wire rope adapted to lift or lower the hook block 6 in relation to the boom arm 5 for operation of the self-hoisting crane in its mounted position on the nacelle 2. In a well-known manner, the pedestal 4 is mounted in a mounting position on a crane base 32 arranged on the nacelle 2. Although in the illustrated embodiments, the crane base 32 is arranged on the nacelle 2 of the wind turbine 3, in other not shown embodiments, the crane base 32 may be mounted on the tower 46 of the wind turbine 3 rather than on the nacelle 2 of the wind turbine. In such case, the crane base 32 may by means of a not shown clamping mechanism be mounted for instance on a top part of the tower 46 in order for the self-hoisting crane 1 to be used for instance during mounting of the nacelle 2 on the tower 46.

Figure 1:
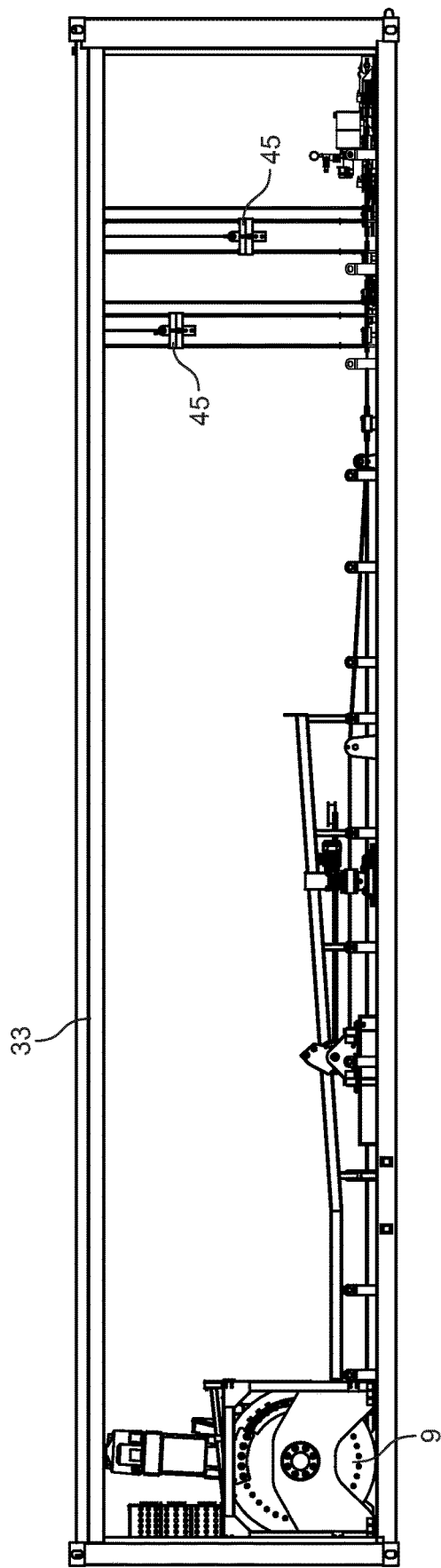
Figure 2:
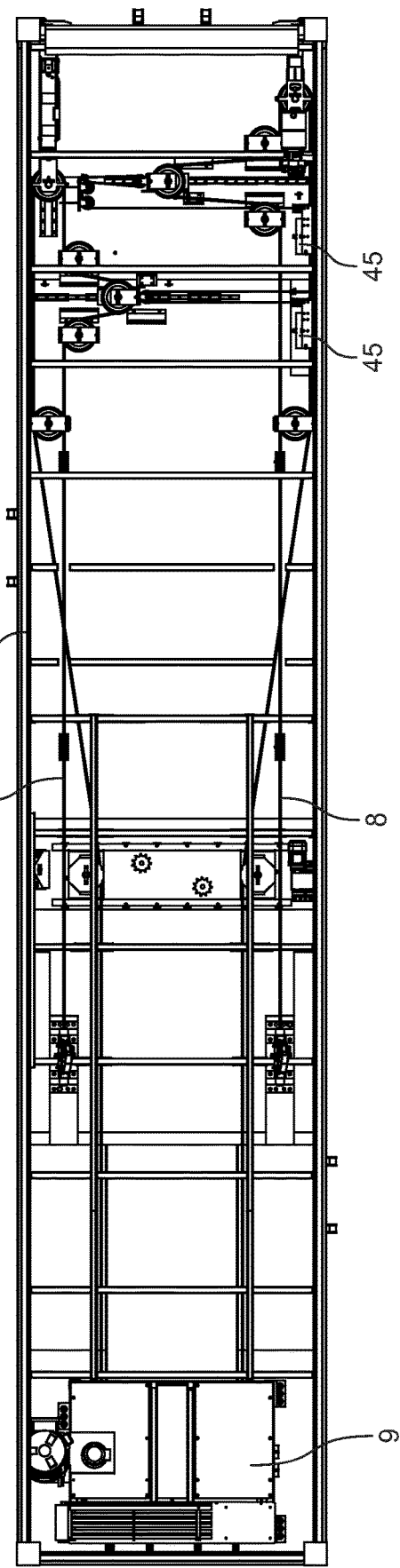
FIG. 2 is a top view of the container of FIG. 1.

The first and second cables 7, 8 extend from the hook block 6, out through the pedestal 4, from the nacelle 2 and to a cable winch 9 arranged at the ground 10. The cable winch 9 is arranged in a container 33 for transporting the self-hoisting crane 1, as seen in FIGS. 1 and 2.

Figure 3:
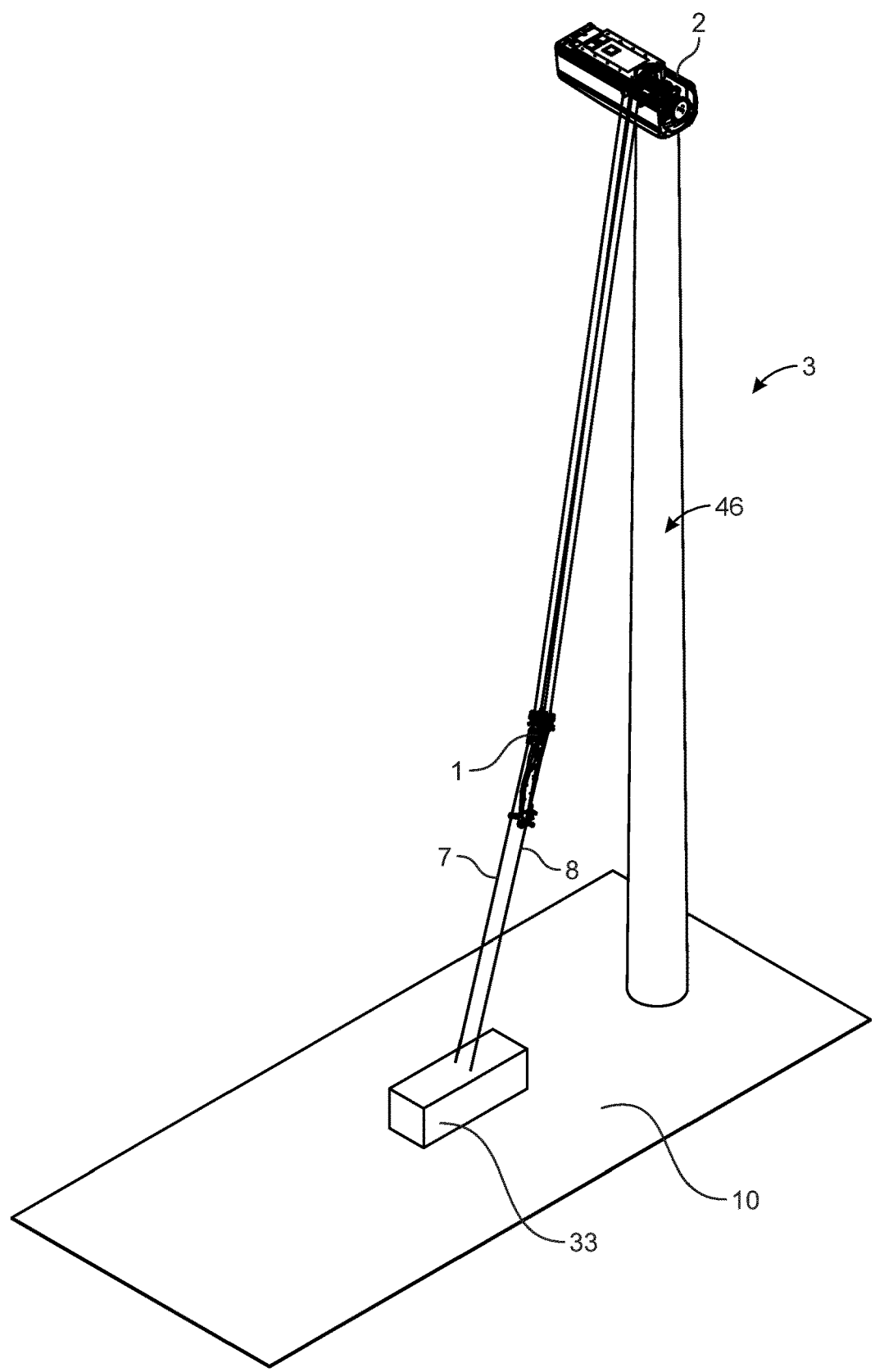
FIG. 3 is a perspective view of a wind turbine during lifting of a self-hoisting crane according to the invention to the nacelle by means of a cable winch in a container as illustrated in FIGS. 1 and 2.

As seen in FIG. 3, the self-hoisting crane 1 is adapted to be hoisted from the ground 10 to the nacelle 2 or to preferably a top part of the tower 46 by operation of the cable winch 9 in the container 33 arranged at the ground. Furthermore, as illustrated in FIG. 4, and the self-hoisting crane 1 is adapted to be operated in its mounted position on the nacelle 2 or on the tower 46 by operation of the cable winch 9 arranged at the ground 10.

In the embodiment illustrated in FIGS. 5 to 9, the self-hoisting crane 1 according to the invention is provided with a cable crawler 11 having a first and a second motor driven traction sheave $12_1$, $12_2$ adapted to, during operation of the self-hoisting crane 1 in its mounted position on the nacelle 2 or on the tower 46, transfer a pulling force $F_P$ to the respective first and second cables 7, 8 through friction. The cable crawler 11 is shiftable between an active state 13 illustrated in FIG. 6 in which the first and second traction sheaves $12_1$, $12_2$ may transfer a pulling force or may transfer at least a substantial pulling force to the respective first and second cables 7, 8 and a passive state 14 illustrated in FIG. 8 in which the first and second traction sheaves $12_1$, $12_2$ may transfer no pulling force or at least substantially no pulling force to the respective first and second cables 7, 8 through friction.

Figure 6:
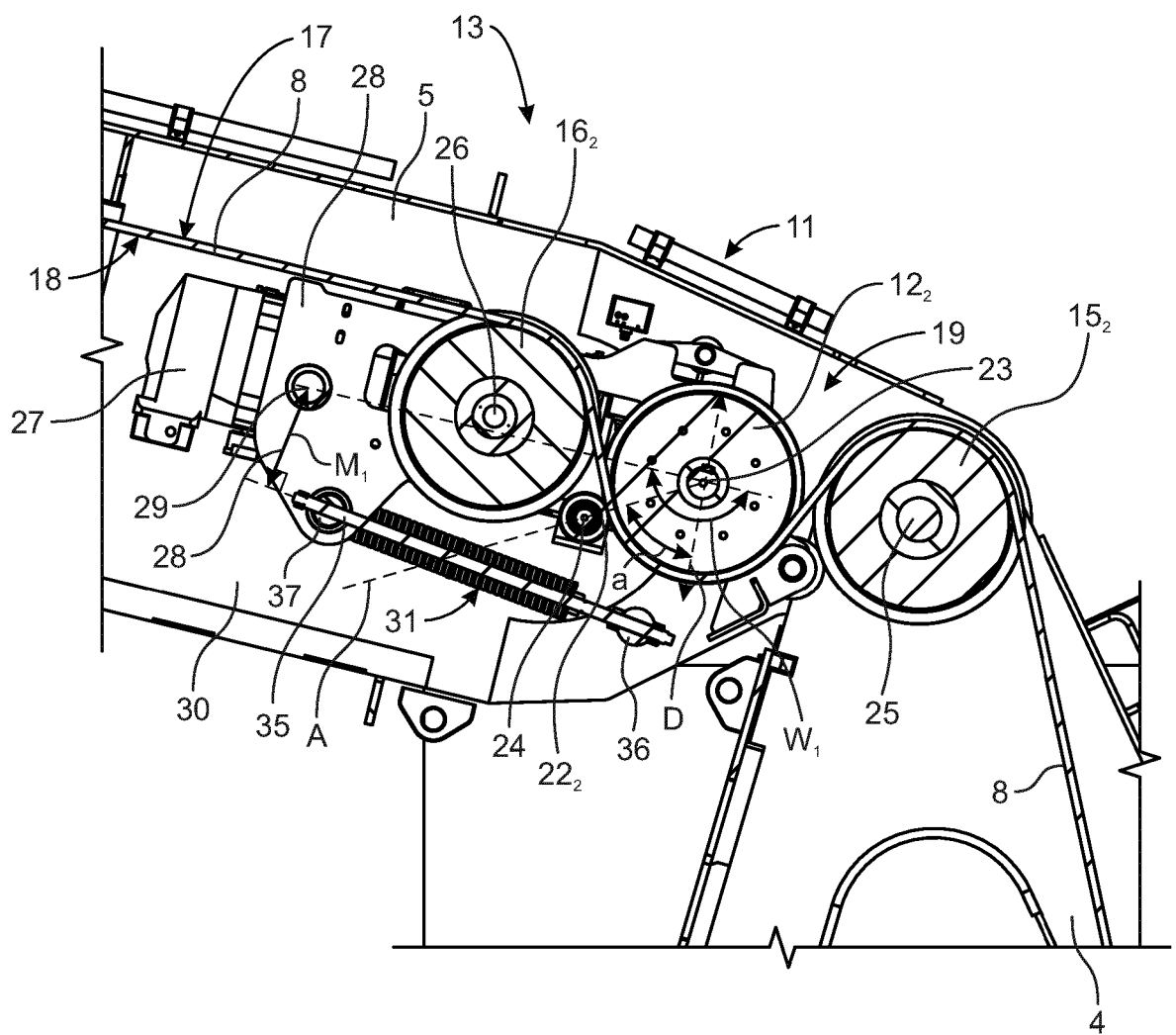
FIG. 6 is a side view showing a detail on a larger scale of the self-hoisting crane of FIG. 5, whereby the cable crawler is in its active state.
Figure 8:
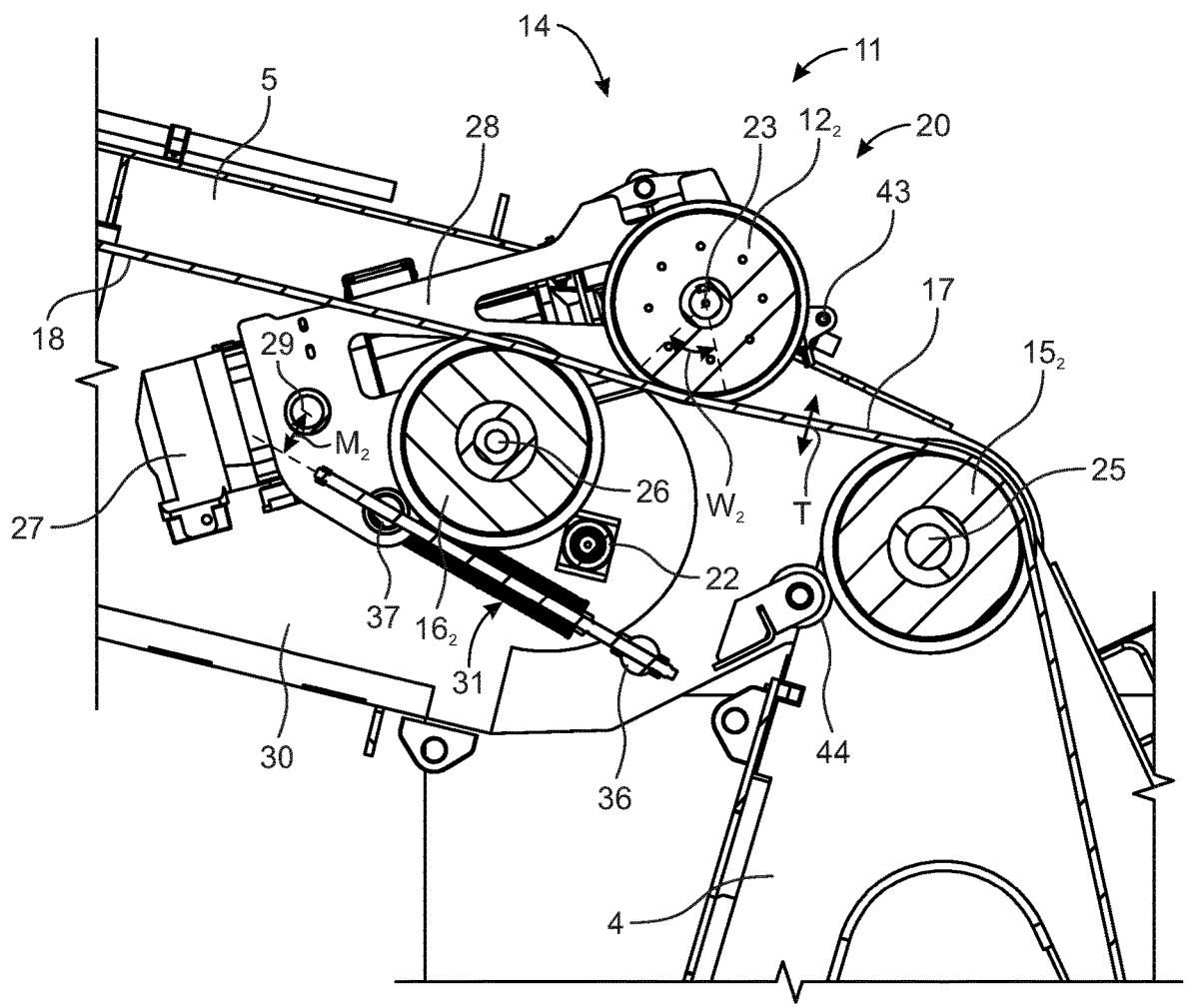
FIG. 8 is a side view corresponding to that of FIG. 6, whereby the cable crawler is in its passive state.

In the illustrated embodiment, in the active state 13 of the cable crawler 11, as illustrated in FIG. 6, a first wrap angle $W_1$ represents the angle of contact between each cable 7, 8 and the respective traction sheave $12_1$, $12_2$. Furthermore, in the passive state 14 of the cable crawler 11, as illustrated in FIG. 8, a second wrap $W_2$ angle represents the angle of contact between each cable 7, 8 and the respective traction sheave $12_1$, $12_2$. As seen, the first wrap angle $W_1$ is substantially greater than the second wrap angle $W_2$. The first wrap angle $W_1$ may for instance be at least 1.5 times and preferably at least 2 times greater than the second wrap angle $W_2$.

As illustrated in FIG. 4, due to the relatively larger first wrap angle $W_1$ in the active state 13 of the cable crawler 11, the first and second motor driven traction sheaves $12_1$, $12_2$ may transfer a total pulling force $F_P$ to the respective first and second cables 7, 8 through friction. Said total pulling force, together with a force $F_2$ corresponding to weight of the hook block 6, is large enough to counteract a force $F_1$ corresponding to the weight of the part of the first and second cables 7, 8 extending from hook block 6, i.e. from the top of the boom arm 5, to the cable winch 9 arranged at the ground 10. In other words: $F_2+F_P>F_1$.

On the other hand, due to the relatively smaller second wrap $W_2$ angle in the passive state 14 of the cable crawler 11, the first and second motor driven traction sheaves $12_1$, $12_2$ may transfer only a relatively very small or almost negligible total pulling force to the respective first and second cables 7, 8 through friction. Therefore, in the passive state 14 of the cable crawler 11, the cable crawler may practically be prevented from providing any substantial unwanted braking force to the cables during the lifting operation.

Figure 7:
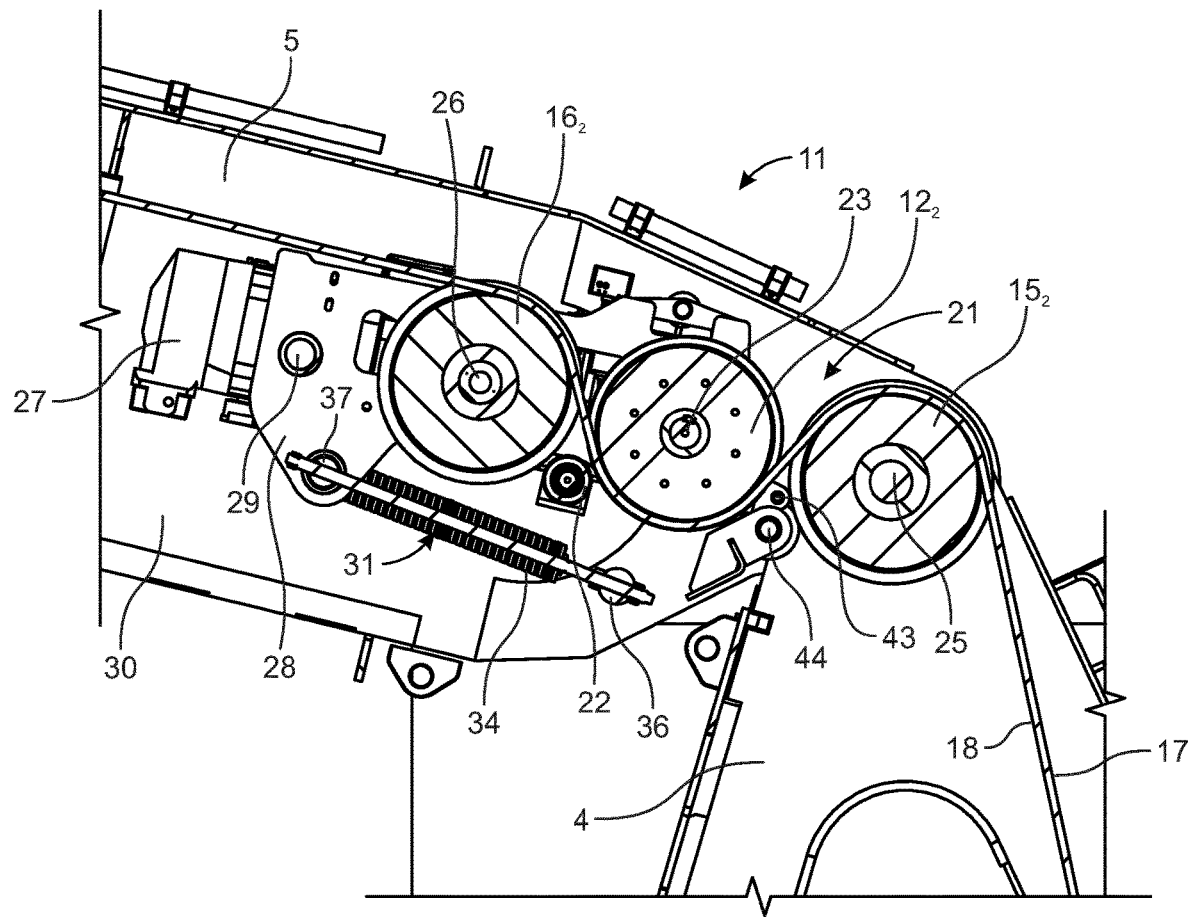
FIG. 7 is a side view corresponding to that of FIG. 6, whereby a motor driven traction sheave of the cable crawler has been slightly moved away from its active position.

FIGS. 6 to 8 illustrate a longitudinal section through the boom arm 5 of the self-hoisting crane 1 as seen in FIG. 4. As seen, the cable 8, in succession, contacts a first support sheave $15_2$, the motor driven traction sheave $12_2$ and a second support sheave $16_2$. Seen in a transverse direction T of the cable 8, the motor driven traction sheave $12_2$ runs on a first traction side 17 of the cable 8 and the first and second support sheaves $15_2$, $16_2$ run on a second side 18 of the cable 8. Comparing FIGS. 6 and 8, it is seen that the motor driven traction sheave $12_2$ is relatively movable in relation to the first and second support sheaves $15_2$, $16_2$ in the transverse direction T of the cable 8 between an active position 19 seen in FIG. 6, in which the cable crawler 11 is in its active state 13, and a passive position 20 seen in FIG. 8, in which the cable crawler 11 is in its passive state 14. Likewise and parallel arranged, the cable 7, in succession, contacts a first support sheave $15_1$, the motor driven traction sheave $12_1$ and a second support sheave $16_1$. Seen in a transverse direction T of the cable 7, the motor driven traction sheave $12_1$ runs on a first traction side 17 of the cable 7 and the first and second support sheaves $15_1$, $16_1$ run on a second side 18 of the cable 7. As understood from FIG. 9, and as it will be explained in further detail below, the first and second motor driven traction sheaves $12_1$, $12_2$ are driven on a common axle by a common motor drive 27. The common motor drive 27 may include a gear box and/or a brake.

As further seen in FIGS. 6 to 8, the first and second support sheaves $15_1$, $15_2$, $16_1$, $16_2$ are fixed rotatably on a frame 30 in the form of the boom arm 5 of the self-hoisting crane 1. The motor driven traction sheaves $12_1$, $12_2$ are arranged displaceably in relation to said frame 30. Alternatively, the motor driven traction sheaves could be fixed rotatably on such frame, and the first and second support sheaves could be arranged displaceably in relation to said frame. In any case, a relative displacement, seen in the transverse direction T of the cables 7, 8, between the motor driven traction sheave and the first and second support sheaves, may change said wrap angle between a relatively large first wrap angle $W_1$ in the active state 13 of the cable crawler 11 and a relatively very small second wrap angle $W_2$ in the passive state 14 of the cable crawler.

In the illustrated embodiment, the cable crawler 11 includes a motor housing 28 provided with the motor drive 27 and the first and second motor driven traction sheaves $12_1$, $12_2$. The motor housing 28 is swingable about a rotation point 29 in relation to the frame 30 carrying the first and second support sheaves $15_1$, $15_2$, $16_1$, $16_2$ between an active position in which the cable crawler 11 is in its active state 13 and a passive position in which the cable crawler 11 is in its passive state 14.

Furthermore, in the illustrated embodiment, the motor driven traction sheaves $12_1$, $12_2$ are spring-biased relatively to the first and second support sheaves $15_1$, $15_2$, $16_1$, $16_2$ from the passive position 20 of the traction sheaves $12_1$, $12_2$ to the active position 19 of the traction sheaves. Thereby, the cable crawler 11 may automatically shift between its active state 13 and its passive state 14 depending on whether the hook block 6 is carrying an external load or not. Instead of being spring-biased by means of mechanical springs, the traction sheaves may also be biased by means of hydraulic means or any other suitable means, such as a gas spring. When the hook block 6 is carrying an external load, the cables 7, 8 may tend to follow an at least relatively straight path and thereby displace the motor driven traction sheaves relatively to the first and second support sheaves, against the spring-bias, so that the traction sheaves $12_1$, $12_2$ reach their passive position 20, as illustrated in FIG. 8. Thereby, the motor driven traction sheaves $12_1$, $12_2$ may be prevented from providing any substantial unwanted braking force to the cables 7, 8 during the lifting operation. On the other hand, when the hook block 6 is not carrying any external load, the cables 7, 8 may follow the path formed by the motor driven traction sheaves $12_1$, $12_2$ and the first and second support sheaves $15_1$, $15_2$, $16_1$, $16_2$, in the active position 19 of the traction sheaves $12_1$, $12_2$, as seen in FIG. 6, without pressing the motor driven traction sheaves $12_1$, $12_2$ relatively to the first and second support sheaves $15_1$, $15_2$, $16_1$, $16_2$, against the spring-bias. Thereby, the traction sheaves $12_1$, $12_2$ may remain in their active position 19 and may therefore transfer a suitable pulling force to the cables 7, 8 through friction, as discussed above. Due to this automatic shift between the active state 13 and the passive state 14 of the cable crawler 11, the operator of the self-hoisting crane 1 may not need to control the cable crawler manually.

Moreover, in the illustrated embodiment, the motor driven traction sheaves $12_1$, $12_2$ are spring-biased from their passive position 20 illustrated in FIG. 8 to their active position 19 illustrated in FIG. 6 by means of a spring pack 31 arranged between the motor housing 28 and the frame 30 of the boom arm 5. The spring pack 31 is loaded with a number of compression springs 34, so that, in the active position of the motor housing 28, the spring pack 31 acts on the motor housing with a first moment arm $M_1$ in relation to the rotation point 29 of the motor housing, as seen in FIG. 6, and, in the passive position of the motor housing 28, the spring pack 31 acts on the motor housing with a second moment arm $M_2$ in relation to the rotation point 29 of the motor housing 28, as seen in FIG. 8, and the first moment arm $M_1$ is greater than the second moment arm $M_2$. Thereby, in the passive state of the cable crawler 11 as seen in FIG. 8, the motor driven traction sheaves may be biased by means of a suitable relatively low force against the cables 7, 8, although the spring force of the spring pack may be larger than in the active state of the cable crawler, due to relatively more compression of the springs 34. Consequently, the cable crawler 11 may not interfere with the operation of the self-hoisting crane 1 when an external load is lifted by the hook block.

Figure 9:
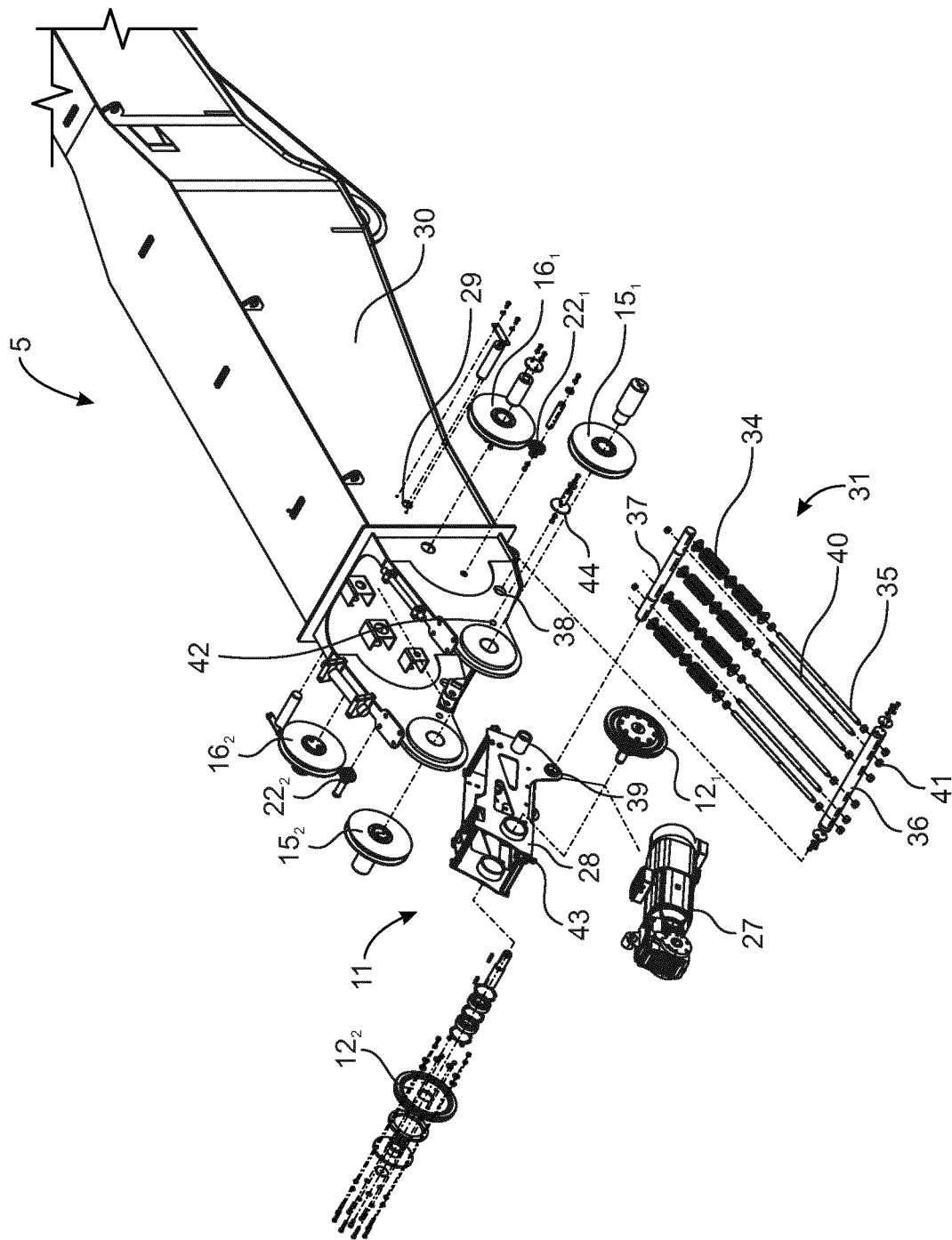
FIG. 9 is an exploded perspective view of part of a boom arm and the cable crawler of the self-hoisting crane of FIG. 5.

As illustrated in FIG. 9, the spring pack 31 is composed by four parallel sets each comprising two compression springs arranged in series, i.e. aligned with each other on a pin 35. By using parallel sets of compression springs, it may be possible to use relatively softer springs and thereby obtain a longer service life. Furthermore, this arrangement does not take up too much space. The pins 35 with compression springs 34 are arranged between a set of two cross-pins 36, 37 of which one 36 is mounted rotatably in a bearing 38 of the boom arm 5 and of which another 37 is mounted rotatably in a bearing 39 of the motor housing 28. The spring pack 31 is further provided with two parallel locking rods arranged between the set of two cross-pins 36, 37 and parallel with and between the pins 35. By means of the locking rods 40 and corresponding locking nuts 41 threaded thereon, the spring pack 31 may be locked in the passive position of the motor housing 28 as seen in FIG. 8, during mounting of the self-hoisting crane 1 or for maintenance purposes.

In order to transfer an even larger pulling force from the motor driven traction sheaves $12_1$, $12_2$ to the respective cables 7, 8 through friction, in the active position 19 of the motor driven traction sheaves 12 illustrated in FIG. 6, the traction sheaves $12_1$, $12_2$ press the cables 7, 8 against respective pressure wheels $22_1$, $22_2$ arranged in bearings 42 in the boom arm 5. Preferably, the motor driven traction sheaves have a diameter of at least 3 times, preferably at least 4 times, the diameter of the pressure wheels. Consequently, the motor driven traction sheave of the cable crawler 11 may transfer an even larger pulling force to the at least one cable through friction.

As illustrated in FIG. 6, in the active position 19 of the motor driven traction sheaves $12_1$, $12_2$, the traction sheaves $12_1$, $12_2$ are guided to be relatively displaceable in relation to the pressure wheels $22_1$, $22_2$ in a direction D forming an angle a of between 30 and 85 degrees, preferably between 45 and 75 degrees, with an axis A through a rotation axis 23 of the traction sheaves and a rotation axis 24 of the pressure wheels $22_1$, $22_2$. Thereby, a wedge-like effect may be obtained when the motor driven traction sheaves are pressed against the respective pressure wheels with the respective cables in between, thereby resulting in that the motor driven traction sheaves may transfer an even larger pulling force to the cables through friction, as explained above.

The motor drive 27 for the motor driven traction sheaves $12_1$, $12_2$ may be switchable between an active mode in which an at least substantial rotational moment may be applied to the traction sheaves $12_1$, $12_2$ and a free-wheeling mode in which no rotational moment or at least no significant rotational moment may be applied to the traction sheaves $12_1$, $12_2$. The cable crawler 11 may be adapted to switch the motor drive 27 to its free-wheeling mode when the cable crawler 11 is shifted from its active state 13 to its passive state 14.

In the illustrated embodiment, switching between the active mode and the passive mode is performed by controlling software in that a signal is received from an inductive switch 43 arranged on the swingable motor housing 28, as seen for instance in FIG. 8, when the inductive switch 43 is near a metal disc 44 arranged on the boom arm 5, as it is the case in FIG. 6. FIG. 7 illustrates an intermediate position of the motor housing 28, in which the motor housing has just left its active position of FIG. 6 and the traction sheaves $12_1$, $12_2$ have just left their active position 19. In this intermediate position, the inductive switch 43 has already switched from the active mode to the passive mode of the motor drive 27. Thereby it may be ensured that in the active mode of the motor drive 27, the cable crawler 11 may transfer sufficient pulling force to the cables 7, 8, whereas in the passive mode of the motor drive, the cable crawler may practically not interfere with the operation of the self-hoisting crane 1 when an external load is lifted by the hook block. In the passive mode of the motor drive 27, the controlling software may simply disconnect the electric connection to an electric motor of the motor drive 27. Furthermore, in the passive mode of the motor drive 27, the controlling software may release a brake for the motor drive. Alternatively, in the passive mode of the motor drive 27, a frequency converter used to control the electric motor may just be set to "no moment". It is preferred that the electric motor is an alternating current motor having coils in both the rotor and in the stator so that it is possible to achieve a very low moment in the passive mode of the motor drive. Otherwise, in an alternative embodiment, switching between the active mode and the passive mode may be performed by a mechanical clutch or any other suitable mechanical system.

The motor drive 27 for the motor driven traction sheaves $12_1$, $12_2$ may be provided with a speed control adapted to, at least in the active mode of the motor drive 27, limit the travel speed of the cables 7, 8 at the position of the self-hoisting crane 1 relatively to the travel speed of the cables 7, 8 at the position of the cable winch 9 arranged at the ground 10. For instance, as an example, the travel speed of the cables 7, 8 at the position of the self-hoisting crane 1 may be controlled to be within 15 to 20 percent of the travel speed of the cables 7, 8 at the position of the cable winch 9. Thereby, it may ensured that the travel speed of the cable does not differ substantially between the position of the self-hoisting crane and the position of the cable winch, as explained above.

The motor drive 27 for the motor driven traction sheaves $12_1$, $12_2$ is preferably provided with a moment control system adapted to ensure that a suitable rotational moment may be applied to the traction sheaves $12_1$, $12_2$ in the active mode of the motor drive 27. In order to adjust and input the desired rotational moment to the moment control system, in the mounted position of the self-hoisting crane 1 on the nacelle 2 or on the tower 46, the self-hoisting crane may simply be set to lower the hook block 6 from the top of the boom arm 5 without any external load attached to the hook block 6, whereby the hook block 6 is lowered by means of the motor drive 27 rotating the motor driven traction sheaves $12_1$, $12_2$. The moment control system is set to raise the rotational moment until a pair of ballast weights for the cables 7, 8, arranged in the container 33, are lifted by the cables 7, 8. When this happens, the rotational moment with which the traction sheaves $12_1$, $12_2$ are rotated, is large enough to outbalance the weight of the part of the cables 7, 8 extending from the nacelle 2 or from the tower 46 to the container 33. This rotational moment may subsequently be set as the desired rotational moment for said moment control system. The system of ballast weights for the cables 7, 8 is well-known in the art and is described in WO 2020221716 A1 mentioned above.

LIST OF REFERENCE NUMBERS a angle
A axis through rotation axis of traction sheave and rotation axis of pressure wheel
D guide direction for traction sheave
$F_1$ force corresponding to weight of cables extending from hook block to cable winch
$F_2$ force corresponding to weight of hook block
$F_P$ pulling force
$M_1$ first moment arm
$M_2$ second moment arm
T transverse direction of cable
$W_1$ first wrap angle
$W_2$ second wrap angle
1 self-hoisting crane
2 nacelle of wind turbine
3 wind turbine
4 pedestal
5 boom arm
6 hook block
7, 8 cable
9 cable winch arranged at ground
10 ground
11 cable crawler
$12_1$, $12_2$ motor driven traction sheave
13 active state of cable crawler
14 passive state of cable crawler
$15_1$, $15_2$ first support sheave
$16_1$, $16_2$ second support sheave
17 first traction side of cable
18 second side of cable
19 active position of traction sheave
20 passive position of traction sheave
21 intermediate position of traction sheave
$22_1$, $22_2$ pressure wheel
23 rotation axis of traction sheave
24 rotation axis of pressure wheel
25 rotation axis of first support sheave
26 rotation axis of second support sheave
27 motor drive for motor driven traction sheave
28 motor housing of cable crawler
29 rotation point of housing
30 frame carrying first and second support sheaves
31 spring pack
32 crane base
33 container for self-hoisting crane
34 compression spring
35 pin for compression spring
36, 37 cross-pin
38 bearing of boom arm
39 bearing of motor housing
40 locking rod of spring pack
41 locking nut
42 bearing in boom arm
43 inductive switch
44 metal disc for inductive switch
45 ballast weight for cable in container
46 tower of wind turbine

The invention claimed is:

1. A self-hoisting crane adapted to be mounted on a nacelle or on a tower of a wind turbine, wherein the self-hoisting crane includes a pedestal, a boom arm, a hook block and at least one cable adapted to lift or lower the hook block in relation to the boom arm for operation of the self-hoisting crane in its mounted position on the nacelle or on the tower, wherein the at least one cable is adapted to extend from the hook block, out through the pedestal, from the nacelle or from the tower and to a cable winch arranged at the ground, wherein the self-hoisting crane is adapted to be hoisted from the ground to the nacelle or to the tower by operation of the cable winch arranged at the ground, and wherein the self-hoisting crane is adapted to be operated in its mounted position on the nacelle or on the tower by operation of the cable winch arranged at the ground, wherein the self-hoisting crane is provided with a cable crawler having at least one motor driven traction sheave adapted to, during operation of the self-hoisting crane in its mounted position on the nacelle or on the tower, transfer a pulling force to the at least one cable through friction, and in that the cable crawler is shiftable between an active state in which the traction sheave may transfer a pulling force or may transfer at least a substantial pulling force to the at least one cable and a passive state in which the traction sheave may transfer no pulling force or at least substantially no pulling force to the at least one cable.

2. A self-hoisting crane according to claim 1, wherein, in the active state of the cable crawler, a first wrap angle represents the angle of contact between the at least one cable and the traction sheave, and wherein, in the passive state of the cable crawler, a second wrap angle represents the angle of contact between the at least one cable and the traction sheave, and in that the first wrap angle is at least substantially greater than the second wrap angle.

3. A self-hoisting crane according to claim 2, wherein the at least one cable, in succession, contacts a first support sheave, the motor driven traction sheave and a second support sheave, in that, seen in a transverse direction of the at least one cable, the motor driven traction sheave runs on a first traction side of the at least one cable and the first and second support sheaves run on a second side of the at least one cable, and in that the motor driven traction sheave is relatively movable in relation to at least one of the first and second support sheaves in the transverse direction of the at least one cable between an active position, in which the cable crawler is in its active state, and a passive position, in which the cable crawler is in its passive state.

4. A self-hoisting crane according to claim 2, wherein a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and wherein the cable crawler is adapted to switch the motor drive to its free-wheeling mode when the cable crawler is shifted from its active state to its passive state.

5. A self-hoisting crane according to claim 1, wherein the at least one cable, in succession, contacts a first support sheave, the motor driven traction sheave and a second support sheave, in that, seen in a transverse direction of the at least one cable, the motor driven traction sheave runs on a first traction side of the at least one cable and the first and second support sheaves run on a second side of the at least one cable, and in that the motor driven traction sheave is relatively movable in relation to at least one of the first and second support sheaves in the transverse direction of the at least one cable between an active position, in which the cable crawler is in its active state, and a passive position, in which the cable crawler is in its passive state.

6. A self-hoisting crane according to claim 5, wherein the motor driven traction sheave is spring-biased relatively to the at least one of the first and second support sheaves from the passive position of the traction sheave to the active position of the traction sheave.

7. A self-hoisting crane according to claim 6, wherein, in the active position of the motor driven traction sheave, the traction sheave presses the at least one cable against at least one pressure wheel.

8. A self-hoisting crane according to claim 6, wherein a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and wherein the cable crawler is adapted to switch the motor drive to its free-wheeling mode when the cable crawler is shifted from its active state to its passive state.

9. A self-hoisting crane according to claim 5, wherein, in the active position of the motor driven traction sheave, the traction sheave presses the at least one cable against at least one pressure wheel.

10. A self-hoisting crane according to claim 9, wherein the motor driven traction sheave has a diameter of at least 3 times, preferably at least 4 times, the diameter of the at least one pressure wheel.

11. A self-hoisting crane according to claim 10, wherein, in the active position of the motor driven traction sheave, the traction sheave is guided to be relatively displaceable in relation to the at least one pressure wheel in a direction forming an angle of between 30 and 85 degrees, preferably between 45 and 75 degrees, with an axis through a rotation axis of the traction sheave and a rotation axis of the at least one pressure wheel.

12. A self-hoisting crane according to claim 9, wherein, in the active position of the motor driven traction sheave, the traction sheave is guided to be relatively displaceable in relation to the at least one pressure wheel in a direction forming an angle of between 30 and 85 degrees, preferably between 45 and 75 degrees, with an axis through a rotation axis of the traction sheave and a rotation axis of the at least one pressure wheel.

13. A self-hoisting crane according to claim 9, wherein a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and wherein the cable crawler is adapted to switch the motor drive to its free-wheeling mode when the cable crawler is shifted from its active state to its passive state.

14. A self-hoisting crane according to claim 5, wherein the cable crawler includes a motor housing provided with a motor drive and the at least one motor driven traction sheave, and wherein the motor housing is swingable about a rotation point in relation to a frame carrying the first and second support sheaves between an active position in which the cable crawler is in its active state and a passive position in which the cable crawler is in its passive state.

15. A self-hoisting crane according to claim 14, wherein a spring pack is arranged between the motor housing and the frame so that, in the active position of the motor housing, the spring pack acts on the motor housing with a first moment arm in relation to the rotation point of the motor housing, and, in the passive position of the motor housing, the spring pack acts on the motor housing with a second moment arm in relation to the rotation point of the motor housing, and wherein the first moment arm is greater than the second moment arm.

16. A self-hoisting crane according to claim 5, wherein a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and wherein the cable crawler is adapted to switch the motor drive to its free-wheeling mode when the cable crawler is shifted from its active state to its passive state.

17. A self-hoisting crane according to claim 1, wherein a motor drive for the at least one motor driven traction sheave is switchable between an active mode in which an at least substantial rotational moment may be applied to the traction sheave and a free-wheeling mode in which no rotational moment or at least no significant rotational moment may be applied to the traction sheave, and wherein the cable crawler is adapted to switch the motor drive to its free-wheeling mode when the cable crawler is shifted from its active state to its passive state.

18. A self-hoisting crane according to claim 17, wherein motor drive for the at least one motor driven traction sheave is provided with a speed control adapted to, at least in the active mode of the motor drive, limit the travel speed of the at least one cable at the position of the self-hoisting crane relatively to the travel speed of the at least one cable at the position of the cable winch arranged at the ground.

19. A self-hoisting crane according to claim 1, wherein the cable crawler is arranged in the self-hoisting crane, preferably in the boom arm, and preferably at an end of the boom arm next to the pedestal.

20. A method of mounting and subsequently operating a self-hoisting crane on a nacelle or on a tower of a wind turbine, whereby the self-hoisting crane includes a pedestal, a boom arm, a hook block and at least one cable adapted to lift or lower the hook block in relation to the boom arm for operation of the self-hoisting crane in its mounted position on the nacelle or on the tower, whereby the at least one cable extends from the hook block, out through the pedestal, from the nacelle or from the tower and to a cable winch arranged at the ground, whereby the self-hoisting crane is hoisted from the ground to the nacelle or to the tower by operating the cable winch arranged at the ground, and whereby the self-hoisting crane is operated in its mounted position on the nacelle or on the tower by operating the cable winch arranged at the ground, wherein the self-hoisting crane is provided with a cable crawler having at least one motor driven traction sheave adapted to transfer a pulling force to the at least one cable through friction, in that the cable crawler is shiftable between an active state in which the traction sheave transfers a pulling force or an at least substantial pulling force to the at least one cable and a passive state in which the traction sheave transfers no or at least substantially no pulling force to the at least one cable, in that, when the self-hoisting crane is operated in its mounted position on the nacelle or on the tower without any or at least substantially without any external load attached to the hook block, the cable crawler is operated in its active state, and in that, when the self-hoisting crane is operated in its mounted position on the nacelle or on the tower with an at least substantial external load attached to the hook block, the cable crawler is operated in its passive state.

* * * * *